United States Patent Office 3,584,016
Patented June 8, 1971

---

3,584,016
18-METHYLENE-STEROIDS OF THE PREGNANE SERIES
Georg Anner and Jaroslav Kalvoda, Basel, Switzerland, assignors to Ciba Corporation, Summit, N.J.
No Drawing. Filed Dec. 17, 1968, Ser. No. 784,492
Claims priority, application Switzerland, Dec. 22, 1967, 18,119/67; Nov. 25, 1968, 1,753/68
Int. Cl. C07c *169/20*
U.S. Cl. 260—397.3                             13 Claims

ABSTRACT OF THE DISCLOSURE 18-methylene-steroids of the pregnane and androstane series and the corresponding 19-nor-derivatives are new and pharmacologically active compound useful as gestagenic, ovulation inhibiting and anabolic-androgenic agents. New methods for the preparation of 18-methylene-steroids in general are based on the conversion of N-oxides of tertiary 18-aminomethyl steroids into 18-methylene-steroids at elevated temperature and on the reaction of 18-oxo-steroids according to Wittig's method with methylene-phosphoranes. A special method for the preparation of the 18-methylene-compounds of the pregnane series consists in the splitting of 18-sulfonic acid esters of 18,20-dihydroxy - 18a,20 - cyclohomopregnane compounds with strong bases. Other special processes are described starting from compounds having the 18-methylene group and in which other functions in the steroid molecule are modified according to known methods.

SUMMARY OF THE INVENTION

The present invention provides 18-methylenesteroids, a group of steroid compounds several of which possess valuable pharmacological properties and which are also especially suitable as intermediates for the manufacture of various other pharmacologically valuable steroid compounds, especially of 18-oxygenated steroids, e.g., those of the pregnane series, such as aldosterone. The 18-methylene-steroids of the invention are accessible by a process in which (a) N-oxides of tertiary 18-aminomethyl-steroids are heated to an elevated temperature, or
(b) 18-sulfonic acid esters of 18,20-dihydroxy-18a,20-cyclo-18-homopregnane compounds are split by treatment with a strong base, or
(c) 18-oxosteroids are reacted with reactive methylene phosphoranes according to Wittig's method, and, if desired, in a resulting compound containing protected functional groups these groups are converted in known manner into free groups or functional groups are functionally modified in known manner, and/or hydroxyl groups are oxidised to oxo groups and/or oxo groups are reduced to hydroxyl groups and/or if desired, double bonds are introduced into rings A and/or B.

DESCRIPTION OF THE PREFERRED EMBODIMENTS

The 18-methylenesteroids accessible by the present process may belong to any desired group of steroids, e.g. the androstane or pregnane series, and may contain further double bonds in the steroid nucleus and in the sidechains. In addition to the 18-methylene group they may contain further substituents in the rings or in the sidechains, especially free or protected hydroxyl or oxo groups, hydrocarbon radicals or halogen atoms. The term 18-methylenesteroids includes also derivatives comprising enlarged or contracted cyclohexane rings, e.g. A-nor-, B-nor- or A-nor-B-homo-steroids, and also 19-nor-18-methylene-steroids.

In the above process (a) there are used N-oxides of tertiary 18-aminomethylsteroids containing on the 13-carbon atom a substituent of the following partial formula

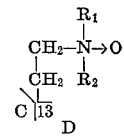

in which $R_1$ and $R_2$ are two identical or different hydrocarbon radical, preferably lower alkyls, and the N-oxides are heated to an elevated temperature in the absence or presence of a solvent or suspending agent that is inert at the decomposing temperature, preferably between 150 and 250° C. Suitable inert solvents or suspending agents are e.g. Tetralin, Decalin or collodine. Preferably, the starting material is subjected to the dry pyrolysis without using a solvent or suspending agent, especially under vacuum, e.g. in a high vacuum, and the reaction product may sublime.

Any sensitive functional groups present in the starting products may, if desired, be protected in known manner before the reaction. More especially, free hydroxyl groups may be esterified or etherified and oxo groups ketalized.

The starting materials of this process can be prepared in known manner from 18-aminomethylsteroids by alkylation and conversion in to the N-oxide e.g. with hydrogen peroxide or with an organic per-acid.

Some of the above-mentioned 18-aminomethylsteroids are known; they can be prepared, for example, from the corresponding 18-cyanosteroids by reduction with a complex light-metal hydride such as lithium-aluminum hydride.

According to the above process (b) the said sulfonic acid esters of 18,20-dihydroxy-18a,20-cyclo-18-homo-pregnane compounds are split with alkaline reagents. The corresponding 18-methylene-20-oxo-pregnane compounds are thus formed. Strong bases such as alkali or alkaline earth metal alcoholates e.g. potassium tertiary butylate, alkali metal amides such as sodamide, or alkali metal hydrides e.g. sodium hydride are used. For the performance of the reaction it is advantageous to use an alcohol as solvent, especially a lower aliphatic alcohol e.g. methanol, ethanol or tertiary butanol, or dimethylformamide, dimethylsulfoxide or dioxan, if desired, or required in the presence of water. The preferred reaction temperature ranges from 0° to 100° C.

The starting materials for the present process can be prepared according to the following scheme of partial formulae:

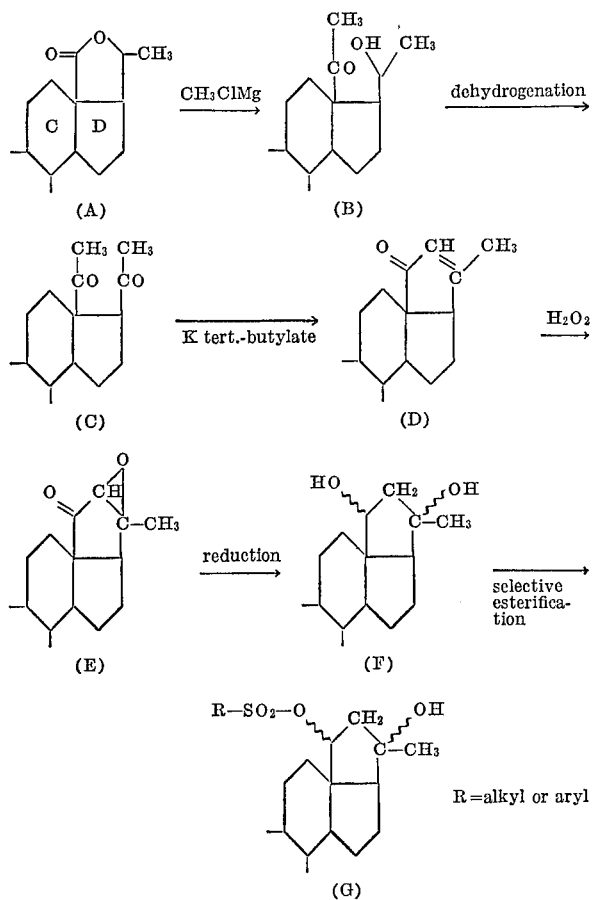

The conversion of a compound of type (A) into a compound of type (B) is performed e.g. by treatment with a Grignard reagent in known manner, for instance by reaction with methyl magnesium chloride in tetrahydrofuran+toluene. The dehydrogenation of (B) to (C) can be achieved with compounds of hexavalent chromium e.g. pyridine+chromic acid or Kiliani solution. The cyclization of (C) to (D) is performed by treatment with a strong alkaline reagent, preferably an alkali metal alcoholate e.g. potassium tertiary butylate in an alcoholic solution. By treatment of the compound of type (D) with hydrogen peroxide and sodium hydroxide solution the epoxide (E) is obtained which on reduction, e.g. with lithium aluminum hydride, is transformed into compound (F). The selective esterification of (F) in position 18, to form the desired 18-sulfonic acid esters of the 18,20-dihydroxy-18a,20-cyclo-18-homopregnane compound, can be performed with a sulfonylhalide in the presence of a tertiary base such as pyridine. Preferred use is made of acid chlorides of lower aliphatic sulfonic acids such as methanesulfonic acid or of monocyclic aromatic sulfonic acids such as p-toluenesulfonic acid, and the esterification is preferably conducted at room temperature or with cooling. In the 18,20-lactones of 20-hydroxy-pregnane-18-acids used as starting materials reactive groups, e.g. a 3-oxo group, are protected during this synthesis e.g. by ketalization.

Finally, according to the process (c) described above 18-oxosteroids are reacted according to Wittig with methylene phosphoranes, especially with methylene triaryl phosphoranes and preferably with methylene triphenyl phosphoranes, using the conditions usual for this reaction and the conventional solvents. Any further oxo groups present in the 18-oxosteroids used must be protected e.g. ketalized.

A protected oxo group in the said starting materials or process products is above all a ketalized oxo group, especially one that is ketalized with a lower aliphatic dihydric alcohol.

Protected hydroxyl groups are e.g. esterified or etherified hydroxyl groups.

Esterified hydroxyl groups are primarily those derived from organic carboxylic acids of the aliphatic, alicyclic, aromatic or heterocyclic series, especially those derived from acids which contain 1 to 18 carbon atoms e.g. from the formic, acetic, propionic acid, the butyric acids or valeric acids such as n-valeric acid, or trimethylacetic acid, trifluoroacetic acid, the caproic acids such as β-trimethylpropionic acid or diethylacetic acid, oenanthic, caprylic, pelargonic, capric, undecylic acids e.g. undecylenic acid, lauric, myristic, palmitic or stearic acids e.g. oleic acid, or from a cyclopropane-, -butane-, -pentane- or -hexane-carboxylic acid e.g. cyclopropylmethanecarboxylic acid, cyclobutylmethanecarboxylic acid, cyclopentylethanecarboxylic or cyclohexylethanecarboxylic acid, from benzoic acid, from phenoxyalkane acids such as phenoxyacetic acid, from dicarboxylic acids such as succinic acid, phthalic or quinolic acid, from furan-2-carboxylic, 5-tertiary butyl-furan-2-carboxylic, 5-bromo-furan-2-carboxylic, 5-bromo-furan-carboxylic acid, from nicotinic or isonicotinic acid, or from sulfonic acids such as benzenesulfonic acids, or from inorganic acids e.g. phosphoric or sulfuric acids.

An etherified hydroxyl group is more especially derived from alcohols containing 1 to 8 carbon atoms, e.g. from lower aliphatic alkanols such as methanol, ethanol, propanol, isopropanol, a butyl or amyl alcohol, or from an araliphatic alcohol, especially a monocyclic aryl-lower aliphatic alcohol such as benzyl alcohol, or from heterocyclic alcohols such as α-tetrahydropyranol or -furanol.

Esterified hydroxyl groups in resulting compounds may be liberated by alkaline hydrolysis or by reduction e.g. with a complex light-metal hydride, whereas etherified hydroxyl groups and ketalized oxo groups are preferably converted by acid hydrolysis in known manner into the corresponding free functional groups. On the other hand, free hydroxyl groups may be esterified e.g. by treatment with reactive functional derivatives of carboxylic acids, especially those specifically mentioned above. The esterification may be carried out in known manner e.g. in the presence of a tertiary base such as pyridine, at room temperature or with heating. Hydroxyl groups are etherified e.g. with alkylhalides or alkylsulfates. Tetrahydropyranyl ethers can be prepared from dihydropyran in the presence of phosphorus oxychloride.

The new 18-methylene steroids of the present invention may be used inter alia as intermediates for the manufacture of 18-oxygenated steroids, especially those of the pregnane series, e.g. aldosterone or 18-hydroxycorticosterone and their derivatives. To convert the 18-methylene steroids into 18-oxygenated steroids the 18,18a-double bond is split in known manner e.g. by ozonisation or by chromic acid oxidation in glacial acetic acid or by dihydroxylation by means of osmium tetroxide and splitting the resulting glycol by means of lead tetracylate or periodic acid. Thus, depending on the oxidant used, there are obtained steroid-18-acids or 18-oxo-steroids which can be converted by known reactions into the desired pharmacologically, active compounds e.g. in the case of pregnane compounds, into those mentioned above.

The present process includes also any variant in which only some of the process steps, if desired in a different order of sequence, are carried out, or in which an intermediate obtained at any stage of the process is used as starting material and any remaining process steps are carried out.

The present invention includes also the 18-methylene steroids of the pregnane, 19-nor-pregnane, the androstane and 19-nor-androstane series and especially those of the formulae

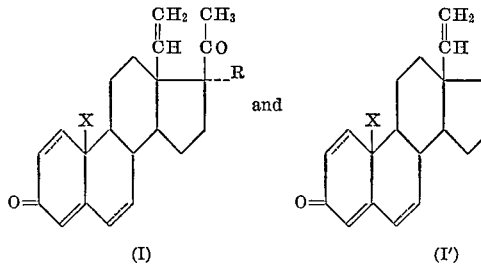

(I)        (I′)

in which X represents hydrogen or a methyl group, R is hydrogen or a free or an esterified hydroxyl group and R′ is an oxo group or a free, an esterified or an etherified hydroxyl group together with hydrogen or with a saturated or an unsaturated, unsubstituted or halogenated lower aliphatic hydrocarbon radical, and which may contain a further double bond in the 6,7-position and, in case X represents a methyl group, a further double bond in 6,7- and/or 1,2-position, as well as 3- and 20-monoketals or 3,20-diketals derived from lower aliphatic alcohols of the compounds of the Formula I.

The esterified hydroxyl groups are primarily derived from the above-mentioned carboxylic acids containing 1–18 carbon atoms and above all from lower aliphatic carboxylic acids such as acetic, propionic, trimethylacetic, valeric or caproic acid.

The etherified hydroxyl groups are primarily derived from alcohols having from 1 to 8 carbon atoms, especially from the lower aliphatic alcohols named above. The saturated or unsaturated, unsubstituted or halogenated lower aliphatic hydrocarbon radical which may be present in 17α-position has preferably 1 to 4 carbon atoms and is e.g. a methyl-, ethyl-, propyl, isopropyl, allyl-, vinyl, methallyl, ethinyl, propinyl, chloro or fluoropropinyl or a trichloro or trifluoropropinyl radical.

Special mention deserves the 18-methyleneprogesterone of the formula (II)

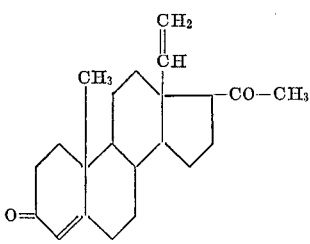

as well as its 1,2- and 6,7-dehydro and 1,2;6,7-bisdehydro-derivatives, the 18-methylene-19-nor-progesterone, the 17α-acetoxy-18-methylene-progesterone, its 19-nor-derivative and the 6-hydro derivatives of these compounds.

The new compounds of the above Formula I possess valuable pharmacological properties. Inter alia, in addition to a gestagenic effect they have especially an inhibiting effect on ovulation as can be shown in animal tests e.g. on rats. The new compounds may therefore be used as gestagens and contraceptives. The new compounds are also valuable intermediates for the manufacture of other useful substances, especially of pharmacologically active compounds.

The 18-methyleneprogesterone for example when administered subcutaneously in doses from 0.01 to 0.03 mg./kg. or perorally in a dose of about 1 mg./kg. to the rabbit, produces a distinct gestagenic effect. A similar activity is also shown by the dehydro derivatives and the other specific compounds mentioned.

The compounds of the above Formula I may be obtained by the above mentioned general processes or according to a preferred process wherein in compounds of the formula (III)

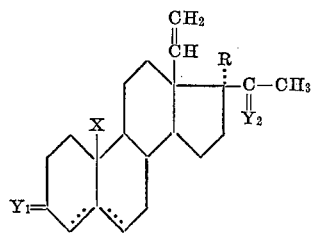

in which X has the meaning given above, $Y_1$ is a hydroxyl group together with hydrogen or a free or ketalized oxo group; $Y_2$ is a free or ketalized oxo group; R is hydrogen or a free or an esterified hydroxyl group, and which contains a double bond starting from carbon atom 5, with the proviso that only $Y_1$ or $Y_2$ may be an oxo group—ketalized oxo groups are converted into free oxo groups and/or possibly a 3-hydroxyl group is dehydrogenated to the oxo group; or in compounds of the formula (IV)

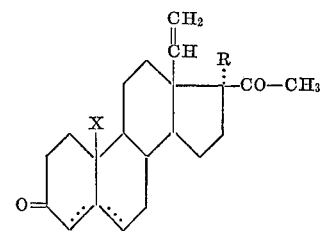

in which X has the above meaning and R is a free hydroxyl group and which contains a double bond starting from carbon atom 5—the hydroxyl group is esterified in known manner, or, in compounds of the Formula III wherein R is hydrogen, a 17α-hydroxy or 17α-acyloxy group is introduced in a manner known per se, and, if desired, in a resulting Δ⁴-3-oxo-compound a double bond is introduced in known manner into the 6,7-position and, in compounds wherein X is a methyl group, in 6,7 and/or 1,2-position.

The above starting materials of the Formula III can be prepared by the general methods described above for the manufacture of 18-methylenesteroids. Starting e.g. from a suitable Δ⁵-pregnane-20-hydroxy-18-acid (18→20) lactone, which may be substituted in position 17, which contains in position 3 a free or protected hydroxyl group or a ketalized oxo group, and applying the above method (b) a compound of the above Formula III is obtained in which $Y_2$ is a free oxo group. According to the present process a ketalized oxo group $Y_1$ is then split in known manner e.g. by treatment with aqueous acetic acid of 60 to 80% strength, if desired in the presence of perchloric acid, whereby the corresponding Δ⁴-3-oxo group is obtained. A Δ⁵-3-hydroxyl group is likewise dehydrogenated to the Δ⁴-3-oxo group in known manner, but under conditions such that the 18-methylene group is not affected, preferably according to the Oppenauer method or with chromium trioxide+pyridine.

The starting material used in the above processes (a) and (c) is advantageously a substance which is substituted in position 17 according to the Formula III, in which the 20-oxo-group is ketalized, and in the case of process (c) it is advantageous to protect also a 3-oxo group in this manner. This procedure yields the monoketals or diketals, especially 20-monoketals and 3,20-diketals, of the above Formula III in which the ketalized oxo groups are then liberated according to this invention in the manner described above. When 20-ketals of Δ⁵-steroids are used that contain a 3-hydroxy group in position 3, the 20-ketal group must according to the present process, be split and the Δ⁵-3-hydroxyl group converted into the Δ⁴-3-keto group in the manner described above.

Starting compounds of the Formula IV may be obtained for instance in a manner known per se by introducing a 17α-hydroxy group into compounds which are unsubstituted in 17α-position. The conversion of these compounds according to the invention into their esters can be carried out in known manner.

In the Δ⁴-3-oxo compounds, which have been obtained by the splitting of ketals according to this invention and/or dehydrogenation of a 3-hydroxyl group, further double bonds may be introduced into position 6,7 and/or, in the case of 10-methyl compounds, in 1,2-position. These dehydrogenations are carried out in known manner especially in position 1, 2 e.g. microbiologically e.g. by means of the microorganism Corynebacterium simplex, or chemically with selenium dioxide in a tertiary aliphatic alcohol such as tertiary amyl alcohol, or with a quinone e.g. dicyanodichlorobenzoquinone, especially also for the introduction of the 6,7-double bond e.g. with chloranil.

The 18-methyleneandrostane compounds of Formula I′ mentioned above display an androgenic and anabolic action and especially an antigonadotrophic action. Compounds which have an unsaturated, unsubstituted or halogenated hydrocarbon radical in 17α-position, also have a gestagenic and anti-ovulatory activity.

There are to be mentioned particularly the 18-methylene -testosterone, -the -18-methylene-17α-methyl-testosterone, 18-methylene-17α-ethinyl-testosterone and their 1-dehydro derivatives and the corresponding 19-nor-compounds, as well as their 17β-esters, especially those derived from lower aliphatic carboxylic acid, and their ethers, primarily those derived from lower alkanols or from tetrahydropyranol.

According to a preferred process the above compounds of Formula I′ may be obtained when in compounds of the formula

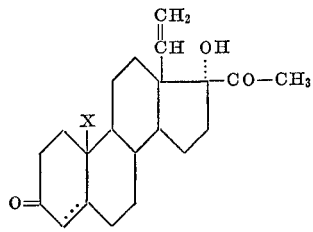

wherein X means a hydrogen atom or a methyl group, the hydroxy acetone side chain is oxydatively degradated to the 17-oxo or 17-hydroxy group with such agents that do not alter the 18-methylene group, in known manner.

According to another known process the compounds of the Formula I′ may be obtained by reducing the 17-oxo group of the compounds of the formula

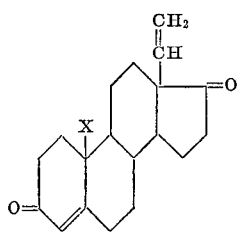

wherein X is hydrogen or a methyl group or in their 1-dehydro derivatives, so as to obtain the 17-hydroxy group, if desired, after having temporarily protected the 3-oxo group and, if desired, with the concomitant introduction of a saturated or unsaturated, unsubstituted or halogenated hydrocarbon radical in 17α-position.

Compounds of the Formula I′ having a free 17β-hydroxyl group may be obtained from the corresponding 17-esters or 17-ethers in a manner known per se by hydrolysis or reduction and compounds of the Formula I′ with an esterified or an etherified hydroxyl group in 17-position may be obtained in a manner known per se by esterification or etherification.

In compounds of Formula I′, which are saturated in 1,2-position and in which X is a methyl group, a 1,2-double bond may be introduced in known manner, e.g. as said above for the pregnane compounds.

The compounds of the Formula I′ can however also be prepared according to one of the processes (a) or (c) mentioned above starting from compounds of the Formula V′ (see below).

The present invention includes also the starting materials and intermediates used in the performance of the above processes. More especially, the present invention is concerned with the new N-oxides of the tertiary 18-aminomethylsteroids, especially those of the formulae

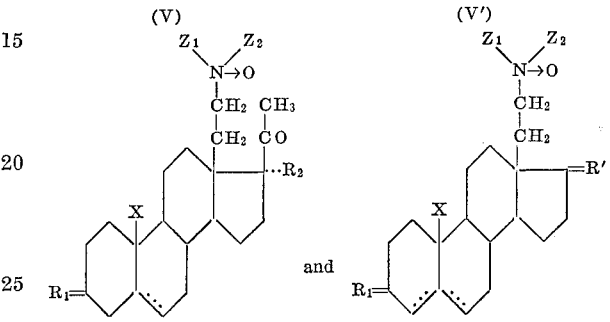

in which X is a hydrogen atom or a methyl group, R₁ is a free or esterified hydroxyl group together with hydrogen, or a free or ketalized oxo group; R₂ is hydrogen or a free or esterified hydroxyl group, R′ has the meaning given in Formula I′ and Z₁ and Z₂ are two identical or different lower alkyl groups—which compounds contain a double bond starting from carbon atom 5, and 20-ketals of the compounds of Formula V. A preferred starting material, which is valuable for the manufacture of the new 18-methyleneprogesterone, is Δ⁵-3-hydroxy - 18 - dimethylaminomethyl - 20,20 - ethylenedioxypregnene - N-oxide.

Likewise new and included in the present invention are the 18-sulfonic acid esters of 18,20-dihydroxy-18,18a-cyclo-18-homopregnane compounds, especially those of the formula

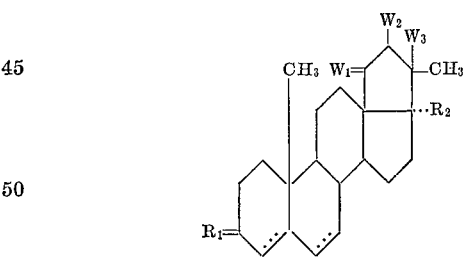

in which R₁ is a free or esterified hydroxyl group together with hydrogen, or a free or ketalized oxo group; R₂ is hydrogen or a free or esterified hydroxyl group; W₁ is a lower alkyl-sulfonyloxy group together with hydrogen; W₂ is hydrogen and W₃ a hydroxyl group, which contain a double bond starting from carbon atom 5.

The new steroids used or obtained in the course of the manufacture of the said sulfonic acid esters are likewise included in the present invention, especially the corresponding 18,20 - dihydroxy-18α,-20-cyclo-18-homopregnane compounds, the 18α,20-oxido-18-oxo-18a,20-cyclo-18 - homopregnane compounds and the Δ¹⁸ᵃ,²⁰-18-oxo-18a,20-cyclo - 18 - homopregnane compounds, especially those compounds of the above Formula VI in which R₁ and R₂ have the same meanings and W₁ is a hydroxyl group together with hydrogen; W₂ is hydrogen and W₃ a hydroxyl group; also those compounds of the above Formula VI in which R₁ and R₂ have the same meanings, W₁ is an oxo group, and W₂+W₃ form an oxido group or a double bond, and which contain a double bond starting from carbon atom 5, as well as their 3-ketals e.g. lower alkylenedioxy-ketals. Special mention deserve $\Delta^{5;18a,20}$-3,3-ethylenedioxy - 18 - oxo - 18a,20-cyclo - 18-homopregnadiene, $\Delta^5$-3,3-ethylenedioxy - 18 - oxo-18a,20-oxido-18,20-cyclo - 18 - homopregnene and $\Delta^5$-3,3-ethylenedioxy - 18,20-dihydroxy - 18a,20-cyclo-18-homopregnene.

The present invention further relates to the manufacture of pharmaceutical preparations for use in human and veterinary medicine, containing the above-mentioned new pharmacologically active substances of the present invention as active ingredient in conjunction with a pharmaceutical excipient. Suitable excipients are organic or inorganic substances suitable for enteral e.g. oral, parenteral or local administration. Suitable excipients are substances that do not react with the new compounds e.g. water, gelatin, lactose, starches, magnesium stearate, talcum, vegetable oils, benzyl alcohols, gums, polyalkyleneglycols, white petroleum jelly, cholesterol or other known medicinal excipients. The pharmaceutical preparations may be in solid form, e.g. tablets, dragées or capsules, or in liquid or semiliquid form solutions, suspensions, emulsions, ointments or creams. These pharmaceutical preparations may be sterilized and/or contain assistants such as preserving, stabilizing, wetting or emulsifying agents, salts for regulating the osmotic pressure or buffers. They may further contain other therapeutically valuable substances. The new compounds may also be used as starting materials for the manufacture of other valuable compounds.

The compounds of the present invention may also be used as additives to animal feedstuffs.

The following examples illustrate the invention.

EXAMPLE 1

A solution of 14 mg. of $\Delta^5$-3,3-ethylenedioxy-18-mesyloxy-20-hydroxy-18a,20-cyclo - 18 - homopregnene in 1 ml. of tertiary butanol is mixed with 14 mg. of potassium tertiary butylate and stirred for 16 hours at 60° C. under nitrogen. The reaction mixture is cooled, mixed with 0.1 ml. of glacial acetic acid, diluted with ice water and three times extracted with methylenechloride. The methylenechloride solutions are washed with saturated sodium bicarbonate solution, dried and evaporated under a water-jet vacuum. The resulting crude 18-methyleneprogesterone - 3 - monoketal (about 11 mg.) is dissolved in 2.5 ml. of acetone, mixed with 6 mg. of p-toluenesulfonic acid and kept for 15 hours at room temperature. Working up and subsequent preparative thin-layer chromatography of the crude product on silicagel (system toluene+ethyl acetate 4:1) furnishes 3 mg. of pure 18-methyleneprogesterone melting at 193–195° C. which is identical with the product described in Example 4.

The starting material may be prepared thus:

A solution of 1.00 g. of $\Delta^5$-3,3-ethylenedioxy-20$\beta$-hydroxypregnene - 18 - acid (18→20)-lactone in 25 ml. of toluene is mixed with 25 ml. of a 2 N-methyl magnesium chloride solution in tetrahydrofuran and refluxed for 4 days under nitrogen. The reaction mixture is cooled to about 5° C. and then cautiously, with vigorous stirring, poured into a mixture of ice and 100 ml. of saturated ammonium chloride solution, the aqueous phase is separated and further extracted with a 4:1 - mixture of ether+methylenechloride; the organic solution and with water, dried and evaporated under a water-jet vacuum. The resulting crystalline crude product (1.0 g.) furnishes on thin-layer chromatography a mixture of $\Delta^5$-3,3-ethylenedioxy-18-methyl - 18 - oxo-20$\beta$-hydroxypregnene and $\Delta^5$-3,3-ethylenedioxy - 18 - methylene - 18,20 - oxidopregnene, melting at 153–156° C. It is oxidized as follows, without first having been purified:

1.0 gram of the crude mixture is dissolved in 3 ml. of pyridine, added to an oxidation mixture prepared from 1.0 g. of chromium trioxide and 15 ml. of pyridine, and the whole is kept for 40 hours at room temperature, then diluted with ethyl acetate, the insoluble material is filtered off, the residue washed with ethyl acetate and the filtrate is evaporated under a water-jet vacuum. The resulting crude product is dissolved in methylene-chloride and filtered through a column of 20 g. of basic alumina. The filtrate is evaporated and once recrystallized from methylenechloride+ether+petroleum ether to furnish 719 mg. of pure 18-methyl-18-oxoprogesterone - 3-monoketal melting at 178–180° C.

A solution of 600 mg. of potassium tertiary butylate in 25 ml. of tertiary butanol is mixed with 1.21 g. of 18-methyl-18-oxoprogesterone-3-monoketal and stirred for 25 minutes at room temperature under nitrogen, then cooled to about 10° C., mixed with 2.5 ml. of glacial acetic acid, poured into ice+water and extracted 3 times with methylenechloride. The extracts are washed with water, saturated sodium bicarbonate solution and once more with water, dried and evaporated under a water-jet vacuum. The residue (1.2 g.) furnishes on one recrystallization from methylenechloride+ether 841 mg. of pure $\Delta^{5;18a,20}$-3,3-ethylenedioxy - 18 - oxo-18a,20-cyclo-18 homopregnadiene melting at 211–213° C.

12.6 ml. of hydrogen peroxide of 30% strength and 4.25 ml. of sodium hydroxide of 10% strength are stirred dropwise within 5 minutes at 5° C. into a solution of 820 mg. of the resulting compound in 8.5 ml. of methylenechloride and 34 ml. of methanol, and the turbid mixture is then kept for 60 hours at 4° C., then diluted with water, extracted 3 times with chloroform while being cooled with ice, the organic phases are washed with water until neutral, dried and evaporated under a water-jet vacuum. The resulting amorphous residue furnishes on crystallization from ether 691 mg. of pure $\Delta^5$-3,3-ethylenedioxy-18-oxo-18a,20-oxido-18a,20-cyclo-18 - homopregnene melting at 195–196° C.

A suspension of 150 mg. of lithium-aluminum hydride in 10 ml. of tetrahydrofuran is mixed with a solution of 500 mg. of the resulting epoxide in 20 ml. of tetrahydrofuran while being cooled (about 10° C.), and the reaction mixture is refluxed for 5½ hours. The excess reducing agent is then decomposed, while being cooled, by adding a mixture of 1.5 ml. of tetrahydrofuran and 0.75 ml. of ethyl acetate and then of 1.5 ml. of tetrahydrofuran and 0.75 ml. of water. The precipitated aluminum and lithium hydroxides are mixed with anhydrous sodium sulfate and suctioned off, and the filtrate is evaporated under a water-jet vacuum. The residue (500 mg.) is purified by being dissolved in a 4:1-mixture of toluene+ethyl acetate and chromatographed on 50 times its own weight of anhydrous silicagel. An identical solvent mixture elutes 185 mg. of pure $\Delta^5$-3,3-ethylenedioxy-18,20-cyclo-18-homopregnene which melts at 206–207° C. after recrystallization from methylenechloride+methanol+ether (172 mg.).

A solution of 150 mg. of the resulting compound in 1 ml. of pyridine is cooled to about −10° C. mixed with 0.1 ml. of methanesulfonylchloride and kept for 18 hours at about 0° C. Usual working up furnishes 107 mg. of a foam which, on crystallization from methylenechloride+ether, furnishes 32 mg. of pure $\Delta^5$-3,3-ethylenedioxy-18-mesyloxy - 20 - hydroxy - 18a,20-cyclo-18-homopregnene melting at 135–137° C. with decomposition.

EXAMPLE 2

A solution of 5.5 g. of $\Delta^5$-3$\beta$-hydroxy-18-dimethylaminomethyl - 20,20 - ethylenedioxypregnene in 110 ml. of methanol is mixed with 5.5 ml. of a hydrogen peroxide solution of 30% strength and stirred for 24 hours at room temperature. The reaction mixture is diluted with 400 ml. of ether, the precipitated crystalline product filtered off and rinsed with ether (2.64 g.) The product is the N-oxide of $\Delta^5$-3$\beta$-hydroxy - 18 - dimethylaminomethyl - 20,20 - ethylenedioxypregnene melting at 205° C. with decomposition. When the above filtrate is evaporated under vacuum, another 1.76 g. of the identical compound are obtained.

2.0 grams of the resulting aminooxide are heated for 20 minutes at 205° C. in a sublimation apparatus under about 0.1 mm. Hg pressure. The sublimate (1.42 g.) and the residue are combined, dissolved in chloroform, successively washed with ice-cold dilute hydrochloric acid, water, sodium bicarbonate solution and once more with water, dried and evaporated under a water-jet vacuum, to yield 1.721 g. of crystalline $\Delta^5$-3$\beta$-hydroxy-18-methylene-20,20 - ethylenedioxypregnene which, after recrystallization from methylenechloride+methanol+ether, melts at 213–216° C. $[\alpha]_D^{20}=+4°$ (c.=0.471).

The dimethylamino compound used as starting material is prepared e.g. as follows: A suspension of 2.0 g. of lithium-aluminum hydride in 200 ml. of tetrahydrofuran is cooled to 0° C. and mixed with a solution of 4.00 g. of $\Delta^5$-3$\beta$-acetoxy - 18 - cyano-20,20-ethylenedioxypregnene [prepared by ketalizing 18-cyano-pregnenolone acetate] in 200 ml. of tetrahydrofuran and refluxed for 4 hours. The mixture is then cooled to about $-5°$ C., cautiously mixed with 10 ml. of a saturated sodium sulfate solution and then with 50 g. of sodium sulfate and the insoluble matter is filtered off. The residue is washed with tetrahydrofuran and the combined filtrates are evaporated under a water-jet vacuum, to yield 3.64 g. of $\Delta^5$-3$\beta$-hydroxy - 18 - aminomethyl - 20,20-ethylenedioxypregnene which, after recrystallization from methylenechloride+methanol+ether, melts at 173–176° C. 1.50 grams of this compound are heated with 50 ml. of ethyl formate for 6 hours in a bomb tube. On evaporation of the solvent under vacuum there are obtained 1.6 g. of crude, crystalline N-formyl compounds which, after recrystallization from methylene-chloride+methanol, melt at 199–201° C. Lithium aluminum hydride reduction under the conditions indicated above furnishes from 900 mg. of this amide 890 mg. of the corresponding 18-methylaminomethyl compound which crystallizes from methylene-chloride+methanol+ethyl acetate and traces of pyridine in the form of colorless needles which are once more formulated and reduced without purification under the indicated conditions. Recrystallization of the resulting crude product furnishes the pure $\Delta^5$-3$\beta$-hydroxy-18-dimethylaminomethyl - 20,20 - ethylenedioxy - pregnene melting at 186–188° C. $[\alpha]_D^{20}=-9°$ (c.=0.722).

EXAMPLE 3

A solution of 348 mg. of $\Delta^5$-3$\beta$-hydroxy-18-methylene-20,20-ethylenedioxypregnene in 2.0 ml. of pyridine is mixed with 2.0 ml. of acetic anhydride and kept for 15 hours at room temperature. The reaction mixture is then poured over ice, extracted with ether and worked up in the usual manner, to furnish 372 mg. of a crystalline crude product which, after recrystallization from methylenechloride+ether+petroleum ether, furnishes 271 mg. of pure $\Delta^5$-3$\beta$-acetoxy - 18 - methylene-20,20-ethylenedioxypregnene having a double melting point of 140–142° and 151–152° C.

A solution of 95 mg. of $\Delta^5$-3$\beta$-acetoxy-18-methylene-20,20-ethylenedioxypregnene in 2 ml. of acetic acid of 66% strength is heated for 15 minutes at 100° C. and then kept for 2 hours at room temperature, then diluted with water and extracted 3 times with ether; the organic extracts are washed with saturated sodium bicarbonate solution and then with water until neutral, dried and evaporated under a water-jet vacuum. The resulting amorphous product is dissolved in ether and filtered through 10 times its own weight of alumina (activity II, neutral). Concentration of the filtrate and crystallization of the resulting residue from aqueous methanol furnishes 65 mg. of pure $\Delta^5$-3$\beta$-acetoxy-18-methylene-20-oxopregnene melting at 111–113° C. $[\alpha]_D^{20}=+54°$ (c.=0.411).

EXAMPLE 4

1.22 grams of $\Delta^5$-3$\beta$-hydroxy-18-methylene-20,20-ethylenedioxypregnene are dissolved in a mixture of 80 ml. of toluene and 20 ml. of cyclohexanone. Then about 60 ml. of toluene are distilled off, and while distilling off another 30 ml. of toluene a solution of 1.85 g. of aluminum isopropylate in 50 ml. of toluene is dropped in, the batch is diluted with 20 ml. of toluene and refluxed for 15 hours under nitrogen. The cooled reaction mixture is diluted with ice-cold dilute sulfuric acid, methylenechloride and ether, and the organic phase is separated, washed with saturated sodium bicarbonate solution and then with water until the washings run neutral, and evaporated under a water-jet vacuum. The oily residue is then 3 times evaporated under vacuum with water, pasted with ether and the resulting crystalline compound is separated from the mother liquor, to yield 810 mg. of a crude product which on recrystallization from methylene chloride+ether+petroleum ether furnishes 698 mg. of pure $\Delta^4$-3-oxo-18-methylene-20,20-ethylenedioxypregnene melting at 176–178° C. $[\alpha]_D^{20}=+128°$ (c.=0.458).

690 mg. of $\Delta^4$-3-oxo-18-methylene-20,20-ethylenedioxypregnene are heated in 14 ml. of acetic acid of 66% strength at about 90° C. until all has dissolved (15 minutes). The solution is cooled, mixed with ice, and the precipitated crystalline compound is filtered off, washed with water, dissolved in a 1:4-mixture of methylene chloride+ether, washed with saturated sodium bicarbonate solution and with water until it is neutral, dried and evaporated under a water-jet vacuum. The resulting crude product furnishes after one recrystallization from methylenechloride+ether+petroleum ether 520 mg. of pure 18-methyleneprogesterone melting at 194–196° C. $[\alpha]_D^{20}=+233°$ (c.=0.500). Ultraviolet spectrum: $\lambda_{max}=241$ m$\mu$ ($\epsilon=16,850$).

EXAMPLE 5

A suspension of 4.0 g. of triphenylmethyl-phosphonium bromide in 60 ml. of ether is stirred under nitrogen and 2.0 g. of an n-butyl lithium+paraffin suspension of 32% strength are added. After 1½ hours at room temperature a solution of 1.0 g. of $\Delta^5$-3,3,20,20-bisethylenedioxy-18-oxopregnene (melting at 174–176° C.) in 20 ml. of tetrahydrofuran is stirred in dropwise and the batch is refluxed for 20 hours under reflux, then cooled, diluted with ether, any insoluble matter is filtered off and washed with water while being cooled with ice, dried and evaporated under a water-jet vacuum. The residue is dissolved in 30 ml. of acetone, mixed with 100 mg. of p-toluenesulfonic acid and kept for 15 hours at room temperature, then diluted with water, and the aqueous suspension is extracted 3 times with 1:4-mixture of methylene chloride+ether. The organic extracts are washed with sodium bicarbonate solution and then with water until neutral, dried and evaporated under a water-jet vacuum, to furnish 790 mg. of a crude product, which on chromatography on anhydrous silicagel (with toluene+ethyl acetate mixtures) and subsequent crystallization of the evaporated eluates (which prove unitary in the thin-layer chromatogram) from methylenechloride+ether+petroleum ether furnishes 450 mg. of pure 18-methyleneprogesterone melting at 193–196° C.

EXAMPLE 6

A solution of 900 mg. of 18-methylene-progesterone in 60 ml. of tertiary butanol is treated with 1.8 g. of chloranil and then refluxed for 3 hours while stirring. The reaction mixture is cooled to room temperature, freed from insoluble matter by filtration, the filter residue washed with chloroform, and the filtrate evaporated under reduced pressure. The resulting crude product which is contaminated with chloranil is dissolved in chloroform, the solution washed in turn three times with water, four times with dilute sodium hydroxide solution, and twice with water, the washings are extracted with chloroform, and the organic phases are dried with sodium sulfate and evaporated under a water-jet vacuum. The product so obtained is then purified by chromatography on silica gel or on neutral alumina (activity II), and recrystallized from methylene chloride+ether. The pure 6-dehydro-18-methylene-progesterone melts at 197–199° C.

EXAMPLE 7

A solution of 500 mg. of the 6-dehydro-18-methylene-progesterone obtained according to Example 6 in 10 ml. of dioxan is treated with 500 mg. of dichlorodicyano-benzoquinone and the mixture refluxed while stirring for 24 hours. The reaction mixture is cooled to room temperature, freed from insoluble matter by filtration and evaporated under a water-jet vacuum. The resulting foam is dissolved in an 80:20 mixture of toluene and ethyl acetate, then filtered through a column made up of 15 g. of alumina (neutral, activity II). The eluates are evaporated under reduced pressure. On crystallization from methylene chloride+ether+petroleum ether, they yield the pure 3,20-dioxo-$\Delta^{1,4,6,18(18a)}$-18-homopregnatetraene. In the UV spectrum, the compound exhibits absorption maxima at 256 m$\mu$ ($\epsilon$=10,000) and 297 m$\mu$ ($\epsilon$=12,400).

EXAMPLE 8

1.0 g. of dichlorodicyano-benzaquinone are added to a solution of 1.0 g. of 18-methylene-progesterone in 20 ml. of dry dioxan, and the whole then refluxed for 18 hours. The cooled reaction mixture is filtered to remove undissolved constituents, concentrated in a water-jet vacuum, evaporated, and the residue dissolved in chloroform, and the solution filtered through 30 times its weight of neutral alumina (activity II). The eluates are evaporated and combined. After being recrystallized from methylene chloride+petroleum ether or methylene chloride+methanol, they yield pure 1-dehydro-18-methylene-progesterone. IR spectrum: bands inter alia at 5.85, 5.98, 6.13 and 6.24 m$\mu$. Melting point: 182–183°.

EXAMPLE 9

A suspension of 2.0 g. of triphenylmethylphosphonium bromide in 35 ml. of ether is stirred under nitrogen and treated with 1.0 g. of a 32% n-butyllithium-paraffin suspension. The reaction mixture is stirred for 2 hours at room temperature, a solution of 500 mg. of $\Delta^{5(10)}$-3,3,20,20 - bisethylenedioxy - 18 - oxo - 19 - nor - pregnene in 15 ml. of tetrahydrofuran is added, and the whole then refluxed for 18 hours. The cooled solution is diluted with ether, filtered to remove insoluble constituents, the filtrate washed with ice-water, dried, and evaporated under a water-jet vacuum. The amorphous residue is dissolved in 15 ml. of acetone, 60 mg. of para-toluenesulfonic acid are added, and the whole allowed to stand at room temperature for 18 hours. The reaction mixture is then poured into ice-water and the aqueous suspension extracted three times with methylene chloride. The extracts are washed neutral with saturated sodium bicarbonate solution and with water, dried and evaporated under a water-jet vacuum, and the crude product chromatographed on silica gel and crystallized from methylene chloride+petroleum ether, when they yield 18-methylene-19-nor-progesterone. [$\alpha$]$_D^{20}$ =+230° (c.=1.00).

The $\Delta^{5(10)}$-3,3,20,20-bis - methylenedioxy - 18 - oxo - 19-nor-pregnene used as starting material can be obtained as follows:

A suspension of 76 g. of lead tetraacetate and 26 g. of calcium carbonate in 5 l. of carbon tetrachloride is heated at 80° C. for a short while, then treated with with 14.0 g. of the 18–20 lactone of 3$\beta$-acetoxy-5$\alpha$-chloro-6$\beta$,20$\beta$-dihydroxy-pregnane-18-acid (prepared from the corresponding known $\Delta^5$-lactone by the addition of hypochloric acid) and 17 g. of iodine. The reaction mixture is then refluxed while being stirred and irradiated with a 1000 watt lamp for 90 minutes. When the product is worked up in the usual manner and chromatographed, the 18,20-lactone of 3$\beta$-acetoxy-5$\alpha$-chloro-6$\beta$,19-oxido -20$\beta$-hydroxy-pregnane-18-acid is obtained which melts at 220–222° C. It is hydrolyzed in position 3 in the known manner, and the resulting 18,20-lactone of 3$\beta$,20$\beta$-dihydroxy- 5$\alpha$-chloro-6$\beta$,19-oxido-pregnane-18-acid (M.P. 302–303° C.) oxidized in an acetone-methylene chloride mixture with 8 N-chromic acid in dilute sulfuric acid to form the corresponding 3-ketone. Heating a methanolic solution of the latter compound with potassium acetate removes the 5-chlorine atom in the form of hydrochloric acid, and the lactone of $\Delta^4$ - 3 - oxo-6$\beta$,19-oxido-20$\beta$-hydroxy-pregnane-18 - acid (M.P. 260–261° C.) is obtained. 6.6 g. of this compound are reduced with 130 g. of zinc powder in 130 ml. of glacial acetic acid and 7 ml. of water to obtain the 18,20-lactone of $\Delta^4$-3-oxo-19,20$\beta$-dihydrovy pregnene-18-acid melting at 256–258° C. Oxidation with 8-N-chromic acid in acetone+methylene chloride followed by decarboxylation of the resulting 19-acid by heating at 50° C. in pyridine for one hour produces the 18,20-lactone of $\Delta^{5(10)}$-3-oxo-20$\beta$-hydroxy-19 - nor - pregnene - 18 - acid. 3.0 g. of this compound are added, while stirring, to a solution of 1.0 g. of oxalic acid in 40 ml. of ethylene glycol, and the reaction mixture allowed to stand at room temperature of 30 minutes. Working up produced the 18, 20-lactone of $\Delta^{5(10)}$-3,3-ethylene-20$\beta$ - hydroxy - 19 - nor-pregnene - 18 - acid. On heating with 20% potassium hydroxide solution, neutralization of the lye with solid carbonic acid, lyophilization of the solution, methylation of the isolated potassium salt of the 18-acid with methyl iodide and oxidation of the hydroxy group in 20-position which is now free, the methyl ester of $\Delta^{5(10)}$-3,3-ethylenedioxy - 20 - oxo - 19 - nor - pregnene - 18 - acid is obtained which, after ketalization, reduction with lithium aluminum hydride and oxidation of the resulting 18-hydroxy group with chromic acid in pyridine, yields the desired $\Delta^{5(10)}$-3,3,20,20 - bis - ethylene - dioxy - 18- oxo-19-nor-pregnene.

EXAMPLE 10

700 mg. of potassium-tertiary butylate are added while stirring to a mixture of 10 ml. of dimethylformamide and 1 ml. of tertiary butanol. At −20° C., 0.6 ml. of triethylphosphite are added, and a moderate current of oxygen is passed through the reaction mixture. The temperature is kept constant and 1.0 g. of $\Delta^5$-3$\beta$-acetoxy-18-methylene-20-oxo-pregnene (prepared as described in Example 3) is added in the course of 5 minutes, and the mixture stirred for another 30 minutes while passing oxygen through it. While cooling, the batch is cautiously acidified, then worked up with methylene chloride. The resulting crude product is suspended in 2 ml. of glacial acetic acid, treated in the course of 45 minutes with 1.2 ml. of trifluoracetic anhydride while stirring and passing nitrogen over the mixture. The batch is then stirred at room temperature for another 4 hours. It is then poured into water and worked up with ether. Chromatographic purification of the crude product so obtained gives the pure $\Delta^5$-3$\beta$,17$\alpha$-diacetoxy-18-methylene-20-oxo-pregnene. IR spectrum: bands inter alia at 5.75, 5.81, 6.10, 8.15 and 9.75$\mu$.

EXAMPLE 11

A solution of 1.27 g. of $\Delta^5$-3,3-ethylenedioxy-18-tosyloxy - 20 - hydroxy - 18$\alpha$,20 - cyclo - 18 - homopregnene in 42 ml. of tertiary butanol and 10 ml. of dioxan is treated with 1.27 g. of potassium-tertiary butylate, and the mixture stirred at 40° C. for 17 hours under nitrogen. The mixture is cooled, treated with 5.3 ml. of glacial acetic acid, diluted with ice-water, the precipitate which forms is filtered off with suction and washed with water. The residue is dissolved in chloroform, washed neutral with water, saturated sodium bicarbonate solution and water, dried and evaporated to dryness under a water-jet vacuum. For purification the amorphous product is dissolved in toluene and chromatographed over 50 times its weight of silica gel. A mixture of toluene+ethyl acetate (95:5) eluates a mixture of $\Delta^5$-3,3-ethylenedioxy-18-methylene - 20 - oxo - pregnene and its epimeric $\Delta^5$-3,3-enthylenedioxy - 18 - methylene - 20 - oxo - 17$\beta$ - H-pregnene.

167 mg. of this mixture are dissolved in 3 ml. of acetone and, after the addition of 15 mg. of para-toluenesulfonic acid, allowed to stand at room temperature for 16 hours.

The batch is diluted with icewater and extracted twice with a 4:1 mixture of ether and methylene chloride, after which the organic phases are washed neutral with water, saturated sodium bicarbonate solution, and water, then dried over sodium sulfate, and evaporated to dryness under a water-jet vacuum. Preparative thin-layer chromatography of the crude product on silica gel (running agent: cyclohexane+acetone 90:10) produces pure 18-methylene-progesterone of melting point 194–196° C. and the isomeric 18-methylene-17β-H-progesterone of melting point 134–136° C.

The 18-tosyloxy compound used as starting material is prepared as follows:

A solution of 1.0 g. of $\Delta^5$-3,3-ethylenedioxy-18,20 dihydroxy-18α,20-cyclo-18-homo-pregnene in 15 ml. of pyridine is treated with 2.45 g. of para-toluene-sulfonic acid chloride and the mixture stirred at room temperature for 65 hours. It is then diluted with ice-water, extracted twice with chloroform, the organic extracts washed neutral with dilute hydrochloric acid, then with saturated sodium bicarbonate solution and again with water, and dried over sodium sulfate before they are evaporated under a water-jet vacuum.

EXAMPLE 12

In a process analogous to that described in Example 5, 1.5 g. of 3β-benzoyloxy-17,17-ethylenedioxy-18-oxo-5α-androstane in 30 ml. of tetrahydrofuran are reacted with a Wittig reagent prepared from 6.0 g. of triphenylmethyl-phosphonium bromide in 100 ml. of ether and 3.0 g. of a 32% N-butyllithium-paraffin suspension. The resulting 3β - benzoyloxy - 17,17 - ethylenedioxy - 18 - methylene-5α-androstane is subjected to hydrolysis with 66% acetic acid for 15 minutes on a water bath without prior purification. Working up in the usual manner yields crude 3β-benzoyloxy-17-oxo-18-methylene-5α-androstane. The compound is practically unitary according to thin-layer chromatography. In the IR spectrum it shows a strong, unsplit band at 5.75µ (no selective absorption in the UV range) and can be used as it is for further reactions. The aldehyde used as starting material can be prepared as follows:

3β-benzoyloxy-18,20β-oxido-5α-pregnane is reacted with acetylbromide (containing traces of hydrobromic acid). The resulting 3β,1-benzoyloxy-18-acetoxy-20α-bromo-5α-pregnane is dehydrobrominated by heating for 1 hour in dimethyl formamide in the presence of lithium bromide and lithium carbonate or in collidine, and the resulting crude product is ozonized in ethyl acetate solution. There is obtained in this manner 3β-benzoyloxy-18-acetoxy-17-oxo-5α-androstane which on successive ketalization, mild hydrolysis and pyridine-chromic acid oxidation yields the desired product.

EXAMPLE 13

1.0 g. of 3β-benzoyloxy-17-oxo-18-methylene-5α-androstene in 10 ml. of a 5% methanolic potassium hydroxide solution is stirred overnight at room temperature under nitrogen. Working up in the usual manner gives the crude 3β-hydroxy-17-oxo-18-methylene-5α-androstane. IR spectrum: bands inter alia at 2.80 and 5.76µ.

EXAMPLE 14

A solution of 1.6 g. of 3β-hydroxy-17-oxo-18-methylene-5α-androstane in 50 ml. of acetone is treated with 2.0 ml. of an 8 N-chromic acid solution in dilute sulfuric acid while a weak current of nitrogen is passed over it at 0° C. The reaction mixture is stirred for another 10 minutes at the same temperature, then poured into an ice-cold solution of 20 g. of sodium acetate in 300 ml. of water and the product worked up with ether+methylene chloride in the usual manner. The resulting crude 3,17-dioxo-18-methylene-5α-androstane (I.R. spectrum: bands inter alia at 5.76 and 5.85) is dissolved in 30 ml. of methanol without prior purification and, after the addition of 800 mg. of oxalic acid, stirred at room temperature for 15 minutes. The mixture is cooled to about 0° C., treated with an ice-cold solution of 2.6 g. of sodium bicarbonate in 20 ml. of water, and worked up with ether. The resulting crude 3,3-dimethoxy-17-oxo-18-methylene-5α-androstane is not purified before being used for the reactions that follow. In the IR spectrum the compound exhibits in the carbonyl range a single band at about 5.84 mµ.

EXAMPLE 15

To a methylmagnesium iodide solution prepared from 700 mg. of magnesium chips and 2.5 ml. of methyl iodide in 20 ml. of ether are carefully added dropwise in the course of 5 minutes 800 mg. of 3,3-dimethyl-17-oxo-18-methylene-5α-androstane, dissolved in a mixture of 70 ml. of ether and 7 ml. of tetrahydrofuran. The reaction mixture is refluxed for 45 minutes while being stirred, then cooled and treated dropwise with a solution of 1.5 ml. of methanol in 10 ml. of ether, diluted with ether and the reaction solution washed successively with 20% ammonium chloride solution, water, 10% sodium thiosulfate solution, water, saturated sodium bicarbonate solution, and water. The washings are extracted with ether, the extracts dried with sodium sulfate and evaporated under a water-jet vacuum. The resulting crude product is dissolved in toluene and the solution chromatographed over 50 times the quantity of silica gel. The resulting pure 3,3 - dimethoxy-17α-methyl-17β-hydroxy-18-methylene-5α-androstane is then dissolved hot in a mixture of 10 ml. of glacial acetic acid and 5 ml. of water and heated at 90° C. for 15 minutes. Working up and chromatography of the crude product on silica gel yields pure 3 - oxo - 17α - methyl - 17β - hydroxy-18-methylene-5α-androstane. IR spectrum: bands inter alia at 2.85, 5.87 and 10.75 mµ.

EXAMPLE 16

1.00 g. of $\Delta^5$-3β-hydroxy-17α-acetoxy-18-methylene-20-oxo-pregnene is dissolved in a mixture of 80 ml. of toluene and 20 ml. of cyclohexanone. After having distilled off 60 ml. of toluene a solution of 1.8 g. of aluminum isopropylate in 50 ml. of toluene are added while distilling off further 30 ml. of toluene. 20 ml. of toluene are added and the reaction mixture is boiled under reflux in an atmosphere of nitrogen for 15 hours. An ice-cold dilute sulfuric acid solution, methylene chloride and ether are added to the cooled reaction mixture, the organic layer is separated, washed with saturated sodium bicarbonate solution and with water, dried and evaporated in a vacuum. The oily residue is steam-distilled and worked up in the usual manner. The crude product obtained (0.9 g.) is purified by chromatography on silica-gel and recrystallized from methylene-chloride-ether. The pure $\Delta^4$-3,20-dioxo-17α-acetoxy-18-methylene-pregnene shows in the IR-spectrum inter alia bands at 5.75µ, 5.85µ, 6.01µ, 6.24µ, 8.15µ and 9.70µ (18-methylene-17α-acetoxy-progesterone).

The starting material is obtained by a partial saponification of $\Delta^5$-3β,17α-diacetoxy-18-methylene-20-oxo-pregnene obtained according to the procedure of Example 10 in a manner known per se, by treatment with an aqueous-methanolic solution of potassium carbonate.

EXAMPLE 17

Pharmaceutical composition useful as gestagen 1000 tablets each containing 5 mg. of 18-methylene progesterone.

| Ingredients: | G. |
|---|---|
| 18-methylene progesterone | 5.0 |
| Lactose | 70.0 |
| Gelatine | 3.0 |
| Wheat starch | 40.0 |
| Arrowroot | 15.0 |
| Magnesium stearate | 0.7 |
| Talc | 6.3 |
| | 140.0 |

Preparation: The mixture of the active ingredient, lactose and wheat starch is moistened with a gelatine solution of 10% strength to form a slightly plastic mass, and then granulated in the usual manner. After being dried at 40° C., the mass is brought into the usual grain size by being passed through a sieve. Arrowroot, magnesium stearate and talc are added to the dried mass and the mixture is then compressed into tablets of 7 mm. diameter.

EXAMPLE 18

Pharmaceutical preparation useful as gestagen 1000 tablets each containing 1 mg. of 18-methylene-17α-acetoxy-progesterone.

Ingredients:

| | G. |
|---|---|
| 18-methylene-17α-acetoxy-progesterone | 1.0 |
| Lactose | 53.0 |
| Gelatine | 1.0 |
| Wheat starch | 39.5 |
| Magnesium stearate | 0.3 |
| Talc | 5.2 |
| | 100.0 |

Procedure of preparation analogous to that described in Example 16.

EXAMPLE 19

Pharmaceutical preparation useful as gestagen 1000 linguettes each containing 1 mg. of $\Delta^4$-17α-ethinyl-18-methylene-17β-hydroxy-3-oxo-androstene.

Ingredients:

| | G. |
|---|---|
| $\Delta^4$ - 17α-ethinyl-18-methylene-17β-hydroxy-3-oxo-androstene | 1.0 |
| Lactose | 100.0 |
| Saccharose | 229.0 |
| Stearic acid | 3.0 |
| Talc | 17.0 |
| | 250.0 |

Procedure: The mixture of the active substance with lactose is moistened with an aqueous solution of saccharose and granulated in the usual manner. After being dried, the sieved granulate is mixed with stearic acid and talc and then compressed into linguettes.

EXAMPLE 20

Pharmaceutical preparation in the form of oil ampoules for its use as gestagen.

100 oil ampoules each containing 10 mg./ml. of 18-methylene progesterone.

Ingredients:

| | | |
|---|---|---|
| 18-methylene progesterone | g | 1 |
| Benzyl alcohol | cc | 10 |
| Sesame oil | cc | 90 |

Procedure of manufacture: The active ingredient is dissolved in benzyl alcohol and the stirred solution diluted with hot sterilized sesame oil. 1 cc. of this solution containing the ingredients in the above given amount is filled in in ampoules which are sterilized at 160° for 1.5 hours.

What is claimed is:

1. A compound of the formula

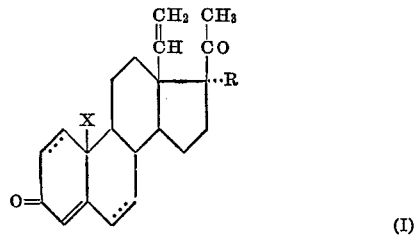

(I)

wherein X represents a member selected from the group consisting of hydrogen and methyl, R a member selected from the group consisting of hydrogen, a free and an esterified hydroxyl group, and their 6,7-dehydro derivatives, and, in case of X being a methyl group, their 6-dehydro, 1-dehydro and 1,6-bis-dehydro derivatives.

2. A compound as claimed in claim 1 wherein an esterified hydroxyl group is derived from an acid having from 1 to 18 carbon atoms.

3. A compound as claimed in claim 1, wherein an esterified hydroxyl group is derived from a lower aliphatic carboxylic acid.

4. A compound as claimed in claim 1 which is a member selected from the group consisting of 18-methylene-progesterone and its 19-nor-derivative.

5. A compound as claimed in claim 1, which is a member selected from the group consisting of the 1-dehydro, the 6-dehydro and the 1,6-bis-dehydro derivative of 18-methylene-progesterone.

6. A compound as claimed in claim 1 which is a member selected from the group consisting of 17α-acetoxy-18-methylene-progesterone, its 19-nor derivative and the 6-dehydro derivatives of these compounds.

7. A compound of the formula

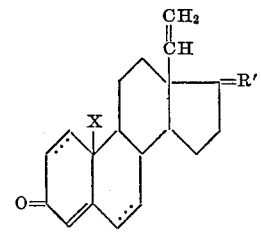

wherein X is a member selected from the group consisting of hydrogen and methyl, R' is a member selected from the group consisting of an oxo group, a free, an esterified and an etherified hydroxyl group together with a member selected from the group consisting of hydrogen and a saturated and an unsaturated lower aliphatic hydrocarbon radical and a halogenated derivative thereof, and their 6-dehydro derivatives, and, in the case that X is methyl, their 6-dehydro, 1-dehydro and 1,6-bis-dehydro derivatives.

8. A compound as claimed in claim 7, wherein an esterified hydroxyl group is derived from an acid having from 1 to 18 carbon atoms.

9. A compound as claimed in claim 7, wherein an etherified hydroxyl group is derived from an alcohol having from 1 to 8 carbon atoms.

10. A compound as claimed in claim 7, wherein an esterified hydroxyl group is derived from a lower aliphatic carboxylic acid.

11. A compound as claimed in claim 8, and which is a member selected from the group consisting of the 18-methylene-testosterone, its 1-dehydro derivative and its 19-nor-derivative.

12. A compound as claimed in claim 8, and which is a member selected from the group consisting of the 18-methylene-17α-methyl-testosterone and its 1-dehydro derivative, and its 19-nor-derivative.

13. A compound as claimed in claim 7, and which is a member selected from the group consisting of the 18-methylene-17α-ethinyl-testosterone and its 1-dehydro-derivative and its 19-nor-derivative.

References Cited

UNITED STATES PATENTS 3,084,158   4/1963   Muller et al. _____ 260—239.55

ELBERT L. ROBERTS, Primary Examiner

U.S. Cl. X.R.

260—397.4, 239.55, 239.57